(12) United States Patent
Qiang

(10) Patent No.: US 8,976,663 B2
(45) Date of Patent: Mar. 10, 2015

(54) QCI BASED OFFLOADING

(71) Applicant: Zu Qiang, Kirkland (CA)

(72) Inventor: Zu Qiang, Kirkland (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 105 days.

(21) Appl. No.: 13/857,432

(22) Filed: Apr. 5, 2013

(65) Prior Publication Data

US 2013/0265879 A1 Oct. 10, 2013

Related U.S. Application Data

(60) Provisional application No. 61/620,721, filed on Apr. 5, 2012.

(51) Int. Cl.
H04L 12/26 (2006.01)
H04W 36/22 (2009.01)
H04W 36/00 (2009.01)
H04W 48/18 (2009.01)
H04W 28/08 (2009.01)
H04W 76/02 (2009.01)
H04W 48/08 (2009.01)
H04W 88/06 (2009.01)

(52) U.S. Cl.
CPC .......... *H04W 36/22* (2013.01); *H04W 36/0022* (2013.01); *H04W 48/08* (2013.01); *H04W 48/18* (2013.01); *H04W 88/06* (2013.01); *H04W 28/08* (2013.01); *H04W 76/026* (2013.01)
USPC ........................................ 370/235

(58) Field of Classification Search
CPC ..... H04W 48/18; H04W 28/08; H04W 36/22; H04W 36/24; H04L 47/125; H04L 47/14
See application file for complete search history.

(56) References Cited

U.S. PATENT DOCUMENTS

| 2010/0208698 | A1 | 8/2010 | Lu et al. | |
|---|---|---|---|---|
| 2012/0020204 | A1* | 1/2012 | Morera et al. | 370/217 |
| 2012/0023189 | A1 | 1/2012 | Giaretta et al. | |
| 2013/0265879 | A1* | 10/2013 | Qiang | 370/235 |
| 2014/0036873 | A1* | 2/2014 | Cheng et al. | 370/331 |
| 2014/0192780 | A1* | 7/2014 | Kim et al. | 370/331 |
| 2014/0204909 | A1* | 7/2014 | Cheng et al. | 370/331 |

FOREIGN PATENT DOCUMENTS

EP 2 445 266 A1 4/2012

OTHER PUBLICATIONS

3GPP TS 23.401, V11.1.0: Technical Specification Group Services and System Aspects; General Packet Radio Service (GPRS) enhancements for Evolved Universal Terrestrial Radio Access Network (E-UTRAN) access (Release 11); Mar. 2012; 284 pages.
3GPP TS 23.402, V11.2.0: Technical Specification Group Services and System Aspects; Architecture enhancements for non-3GPP accesses (Release 11); Mar. 2012; 251 pages.

(Continued)

*Primary Examiner* — Raj Jain
(74) *Attorney, Agent, or Firm* — Ericsson Canada Inc.; Alex Nicolaescu

(57) ABSTRACT

A QoS based selection of access network allows a UE to transmit different data traffic flows using different access technologies. The selection is done in accordance with information provided in the ANDSF. This allows a network operator to determine how different data traffic is routed, which can allow for better network utilization planning.

11 Claims, 2 Drawing Sheets

(56) References Cited

OTHER PUBLICATIONS

3GPP TS 24.302, V11.2.0: Technical Specification Group Core Network and Terminals; Access to the 3GPP Evolved Packet Core (EPC) via non-3GPP access networks; Stage 3 (Release 11); Mar. 2012; 59 pages.

3GPP TS 24.312, V11.2.0: Technical Specification Group Core Network and Terminals; Access Network Discovery and Selection Function (ANDSF) Management Object (MO) (Release 11); Mar. 2013; 159 pages.

3GPP TSG SA WG2 Meeting #86: Solution for Identification of traffic based on EPS QoS; Naantali, Finland; Jul. 11-15, 2011; 2 pages.

"Advanced EPC architecture for smart traffic steering"; Celtic; Nov. 1, 2011; XP055083483; 63 pages.

International Search Report for PCT/IB2013/052747, mailing date of Nov. 6, 2013; 6 pages.

* cited by examiner

QCI BASED OFFLOADING

CROSS REFERENCE TO RELATED APPLICATIONS

This application claims the benefit of priority to U.S. Provisional Patent Application No. 61/620,721 filed Apr. 5, 2012, the contents of which are incorporated herein by reference.

TECHNICAL FIELD

This disclosure relates generally to access network selection by User Equipment.

BACKGROUND

In a 3GPP network, the Access Network Selection and Discovery Function (ANDSF) contains data management and control functionality necessary to provide access network discovery and selection assistance data as per operators' policy. In 3GPP standardization today, ANDSF supports three types of policy: ForServiceBased, ForFlowBased, and NonSeamlessOffload.

User Equipment (UE) configured for IP Flow Mobility and Seamless Offload (IFOM) uses the ForFlowBased Inter-System Routing Policy (ISRP) to select an access technology or an access network or both for routing user plane traffic matching specific IP flows on a specific or any APN identified in the ISRP; and decide if an access technology or access network or both are restricted for a specific IP flows on a specific or any APN identified in the ISRP.

A UE configured for MAPCON uses the ForServiceBased ISRP to select an access technology or an access network or both for routing user plane traffic matching a specific APN or any APN identified in the ISRP; and decide if an access technology or an access network or both are restricted for a specific APN or any APN identified in the ISRP.

A UE configured for non-seamless WLAN offload uses the NonSeamlessOffload ISRP to select a WLAN access network for routing, without traversing the EPC, user plane traffic matching specific IP flows for a specific APN or any APN identified in the ISRP; and decide if a WLAN access network is restricted for routing, without traversing the EPC, a specific IP flows for a specific APN or any APN identified in the ISRP.

All the three types ISRP are either APN based or IP flow based. None of the ISRP allows the UE to select an access technology or an access network or both for routing user plane traffic based the Quality of Service (QoS) classes, e.g. QCI. As a result, scenarios in which a UE is handling data traffic requiring a high level of QoS, while also handling traffic for which best effort delivery suffices, cannot make use of multiple network connections in any sort of automated fashion.

With the APN based ISRP rule, the UE sets up the PDN connection using the APN. And all traffic within the APN will be routed into the selected access network regardless of the QoS level on each bearer within the PDN connection.

With the flow based ISRP rule, including NonSeamlessOffload rule and ForFlowBased rule, the defined IP flow can be routed by the UE to the selected access. However, the IP flow has to be defined by the network dynamically.

The ANDSF rules is either statically configured in the UE by the operator or the dynamically downloaded from ANDSF server. Some of the limitations include that:

When the rules are statically configured, the rules can only be setup base on some assumptions, e.g. a server IP address. As the UE IP address is dynamically assigned by the network at PDN connection setup, UE IP address cannot be included in the rules.

When the rules can be dynamically downloaded, the ANDSF communication is not designed for real time update. Therefore it cannot be used to update the rules for each established PDN connections.

When the rule is configured using server IP address, it is possible that more than one type of services are provided by the same server, each of the services requiring different QoS.

Therefore, it would be desirable to provide a system and method that obviate or mitigate the above described problems.

SUMMARY

It is an object of the present invention to obviate or mitigate at least one disadvantage of the prior art.

Embodiments of the present invention provide for the operator to use ANDSF rules that can be either statically or dynamically configured in the UE. Such an ANDSF rule would allow for dynamic access network selection based on a QoS assigned to the traffic flow.

In one embodiment, the ANDSF rule includes an N-tuple which contains (access type, APN, and QoS classifications).

In a first aspect of the present invention, there is provided a method of offloading traffic from a 3GPP network to a non-3GPP network, by a User Equipment. The method comprises the steps of receiving differential offload instructions from a network entity; selecting, in accordance with the received instructions and an indication of a class of quality of service associated with a first data traffic flow, a first access network from the 3GPP and non-3GPP networks; and transmitting data traffic associated with the first data traffic flow over the selected first access network.

In an embodiment of the first aspect of the present the method further includes the steps of selecting, in accordance with the received differential offload instructions and an indication of a class of quality of service associated with a second data traffic flow, a second access network from the 3GPP and non-3GPP networks; and transmitting data traffic associated with the second data traffic flow over the selected second access network. In a further embodiment, the selected first access network and the selected second access network are different from each other, and optionally the first and second data traffic flows terminate at the same network node.

In a further aspect of the present invention, the class of quality of service associated with the first data traffic flow is absent, and prior to the step of selecting the class of quality of service is set to a default value. In a further embodiment, the network entity from which differential offload instructions are received is an Access Network Selection and Discovery Function (ANDSF). In another embodiment, the indication of a class of quality of service is a Quality of Service Class Indicator (QCI), and optionally the differential offload instructions are n-tuples containing an access type, an access point name (APN) and a QCI.

In a second aspect of the present invention, there is provided a User Equipment (UE) for communicating with a 3GPP network and a non-3GPP network. The UE comprises a 3GPP network interface, a non-3GPP network interface, a processor and a memory. The 3GPP network interface is used to communicate with the 3GPP network. The non-3GPP second network interface is used to communicate with the non-3GPP network. The memory stores a set of differential routing rules and program instructions.

The processor executes the instructions stored in the memory, and upon doing so selects an access network from the 3GPP network and the non-3GPP network over which data traffic associated with a first data traffic flow should be routed in accordance with the stored set of differential routing rules and a Quality of Service Class Indicator, QCI, associated with the first data traffic flow. The processor then transmits the data traffic associated with the first data traffic flow over the selected access network through the network interface associated with the access network.

In an embodiment of the second aspect of the present invention, the processor, upon execution of the stored program instructions will further select a second access network from the 3GPP network and the non-3GPP network over which data traffic associated with a second data traffic flow should be routed in accordance with the stored set of differential routing rules and a Quality of Service Class Indicator, QCI, associated with the second data traffic flow, and to transmit the data traffic associated with the second data traffic flow over the selected second access network through the network interface associated with the second access network. In another embodiment, one of the selected access network and the second selected access network is a 3GPP network, and the other of the selected access network and the second selected access network is a non-3GPP network.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
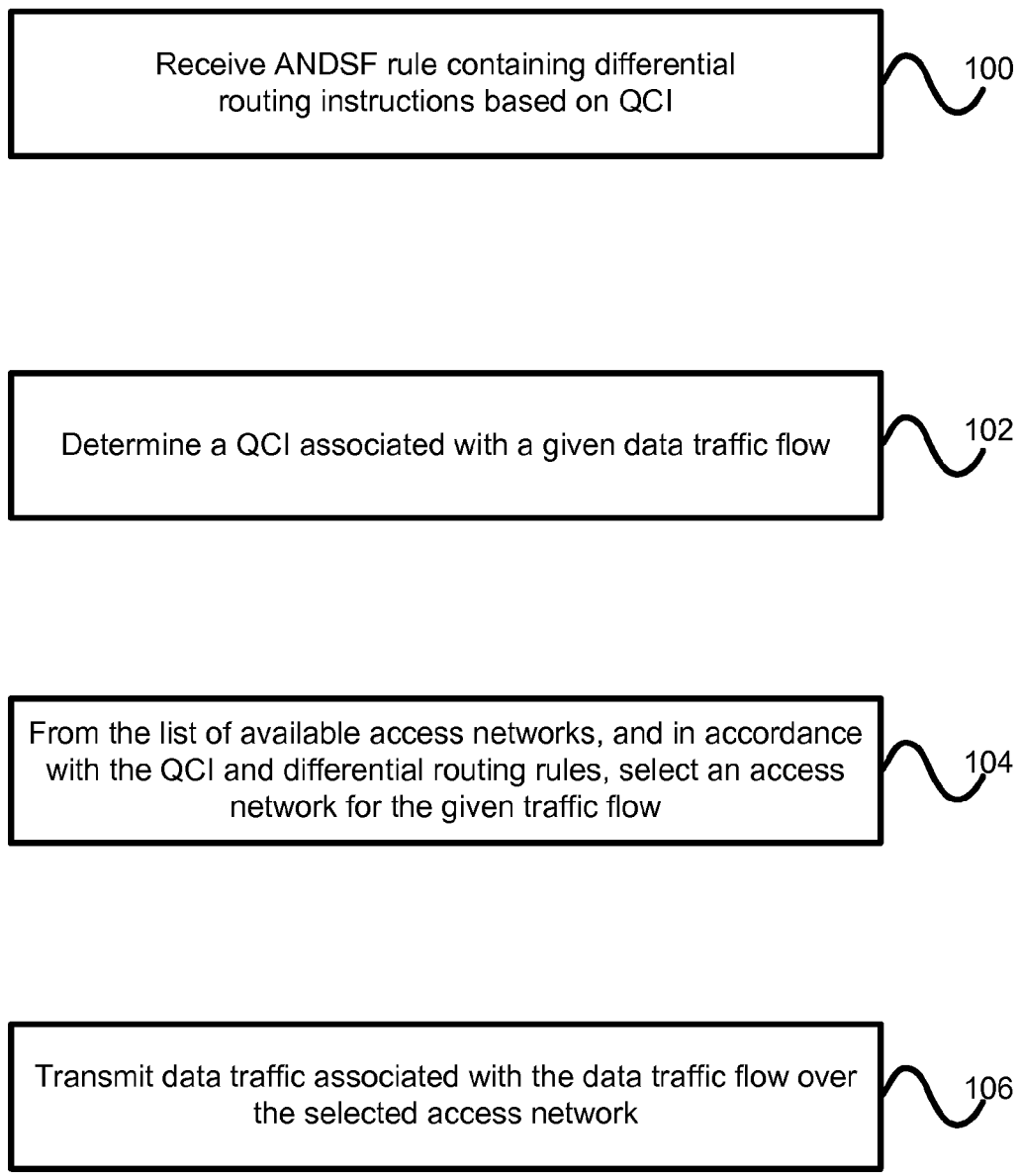
FIG. 1 is a flow chart illustrating an exemplary method.

The present invention is directed to a system and method for the generating and accepting QOS based selections of access networks.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Whereas in the prior art, an ANDSF rule indicates when and under what circumstances a UE should offload its data connection from a 3GPP network to a non-3GPP network, The ANDSF rules discussed here can be configured in the UE with the QoS classification parameters, e.g. QCI as a factor in making decisions about how data traffic is offloaded. One example of such rules could be "if QCI=1, only 3GPP access", or "if QCI>9, 3GPP or WLAN". QoS class identifier (QCI) is the 3GPP QoS classification technical term. In other non-3GPP access, a different the term for the same function may be used. In this document, QCI is used to explain the details of a particular implementation, and should not be considered restrictive.

The QCI is typically a scalar value that is used as a reference to a specific packet forwarding behavior. This may be implemented in the access network by the QCI referencing node specific parameters that control packet forwarding treatment (e.g. scheduling weights, admission thresholds, queue management thresholds, link layer protocol configuration, etc.), that have been pre-configured by the operator at a specific node(s) (e.g. eNodeB).

When a PDN connection is setup in 3GPP access, the UE receives the QCI for each bearer within the PDN connection. With a set of ANDSF rules that dictate behavior on a per QCI basis, the UE can decide to keep the voice bearer in 3GPP access because of a QCI value of 1; and it may open the WiFi interface and offload traffic for which there is no QCI (and thus no QoS).

One skilled in the art will appreciate that it is possible to provide the rule based on the combination of access type, APN and QCI. Therefore the UE can route the IP flow to the selected access network based the QoS classification from the selected PDN connections.

With the QoS classification based routing rule, the operator can force the UE to offload IP flow dynamically based on QoS classification parameters. This can avoid the requirements of dynamic ANDSF rule updating.

One skilled in the art will appreciate that in handling data traffic, the UE will determine the QCI associated with the data traffic. Then, in accordance with the ADNSF received from the network, will select an access network, such as an LTE connection, a BBF based WiFi connection, or a conventional WiFi connection such as a public or private hotspot. The selected access network will then be used to transmit the data traffic. This allows for different data flows to have different priorities and different network access technologies to be used for different data flows.

FIG. 1 illustrates an exemplary method for execution at the UE for carrying out the above described process. In step 100, the UE receives ANDSF rules that contain QCI based differential routing instructions. In step 102, the UE determines a QCI associated with a given data traffic flow. Based on the determined QCI, an access network is selected in accordance with the QCI based differential routing instructions in step 104, and the traffic associated with the data flow is then transmitted over the selected access network in step 106.

Figure 2:
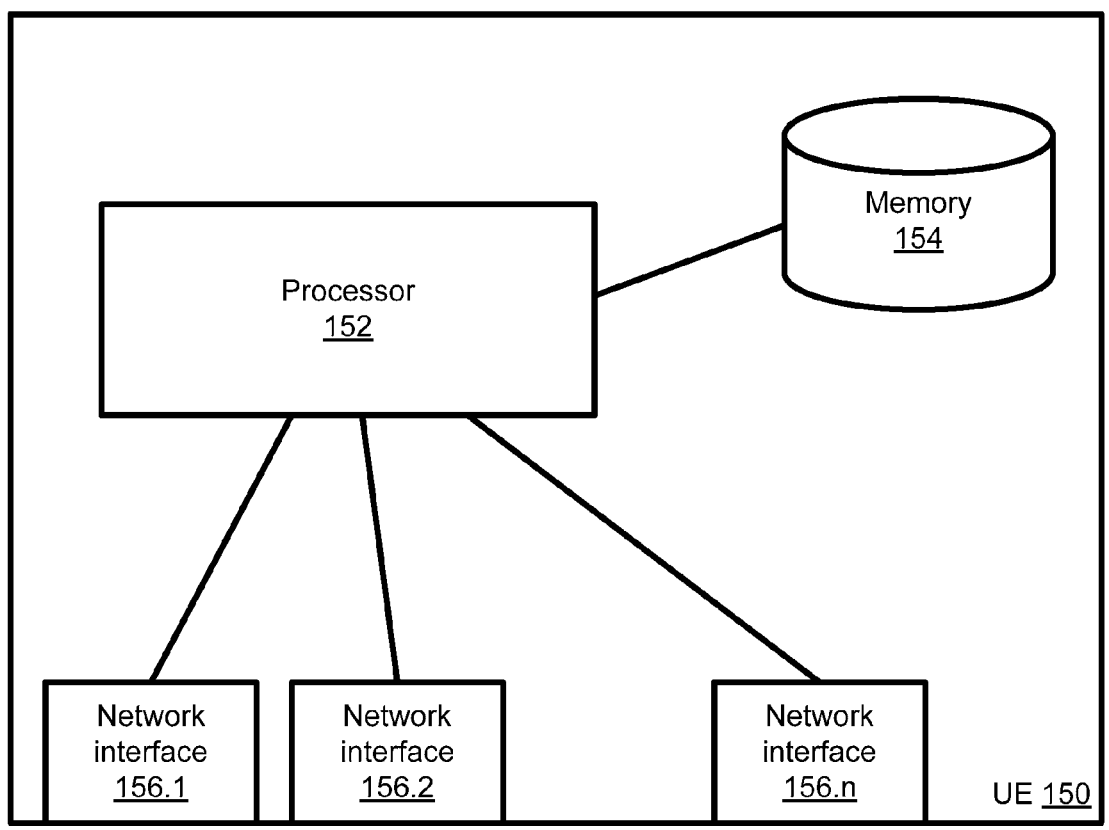
FIG. 2 is a block diagram illustrating an functional view of a handset according to an embodiment of the present invention.

FIG. 2 is a block diagram of a UE for carrying out the method of FIG. 1. A UE 150 has a processor 152, a memory 154 and a set of network interfaces 156.1 through 156.n. An ANDSF rule containing QCI based selection information is received over a 3GPP compliant network interface, such as interface 156.1. The rule is received by processor 152 and stored in memory 154. The processor 152, using instructions stored in memory 154, determines that a data flow has a particular QCI, and in accordance with the stored ANDSF rule, processor 152 selects network interface 156.2 (for example a WiFi interface) to be used to transmit the data associated with the data flow. Another data flow, such as the voice traffic for a phone call, can still be transmitted over network interface 156.1. It should be understood that although the different network interfaces logically separate, they will also provide connections to at least two different network access technologies. One physical network interface may act as a series of logical network interfaces (though this may not happen simultaneously).

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of offloading traffic from a 3GPP network to a non-3GPP network, by a User Equipment, the method comprising:
   receiving differential offload instructions from a network entity;
   selecting, in accordance with the received instructions and an indication of a class of quality of service associated with a first data traffic flow, a first access network from the 3GPP and non-3GPP networks; and
   transmitting data traffic associated with the first data traffic flow over the selected first access network.

2. The method of claim 1 further including the steps of:
   selecting, in accordance with the received differential offload instructions and an indication of a class of quality of service associated with a second data traffic flow, a second access network from the 3GPP and non-3GPP networks; and
   transmitting data traffic associated with the second data traffic flow over the selected second access network.

3. The method of claim 2 wherein the selected first access network and the selected second access network are different from each other.

4. The method of claim 3 wherein the first and second data traffic flows terminate at the same network node.

5. The method of claim 1 wherein the class of quality of service associated with the first data traffic flow is absent, and prior to the step of selecting the class of quality of service is set to a default value.

6. The method of claim 1 wherein the network entity from which differential offload instructions are received is an Access Network Selection and Discovery Function (ANDSF).

7. The method of claim 1 wherein the indication of a class of quality of service is a Quality of Service Class Indicator (QCI).

8. The method of claim 7 wherein the differential offload instructions are n-tuples containing an access type, an access point name (APN) and a QCI.

9. A User Equipment (UE) for communicating with a 3GPP network and a non-3GPP network, the UE comprising:
   a 3GPP network interface for communicating with the 3GPP network;
   a non-3GPP second network interface for communicating with the non-3GPP network;
   a processor for executing stored instructions; and
   a memory for storing a set of differential routing rules and for storing program instructions that when executed cause the processor to select an access network from the 3GPP network and the non-3GPP network over which data traffic associated with a first data traffic flow should be routed in accordance with the stored set of differential routing rules and a Quality of Service Class Indicator, QCI, associated with the first data traffic flow, and to transmit the data traffic associated with the first data traffic flow over the selected access network through the network interface associated with the access network.

10. The User Equipment of claim 9 wherein the stored program instructions, when executed further cause the processor to select a second access network from the 3GPP network and the non-3GPP network over which data traffic associated with a second data traffic flow should be routed in accordance with the stored set of differential routing rules and a Quality of Service Class Indicator, QCI, associated with the second data traffic flow, and to transmit the data traffic associated with the second data traffic flow over the selected second access network through the network interface associated with the second access network.

11. The User Equipment of claim 10 wherein one of the selected access network and the second selected access network is a 3GPP network, and the other of the selected access network and the second selected access network is a non-3GPP network.

* * * * *